May 25, 1954
J. G. ATWOOD
2,679,185
APPARATUS USING MONOCHROMATIC RADIATION
OF DIFFERENT WAVELENGTHS
Filed Aug. 1, 1952
3 Sheets-Sheet 1
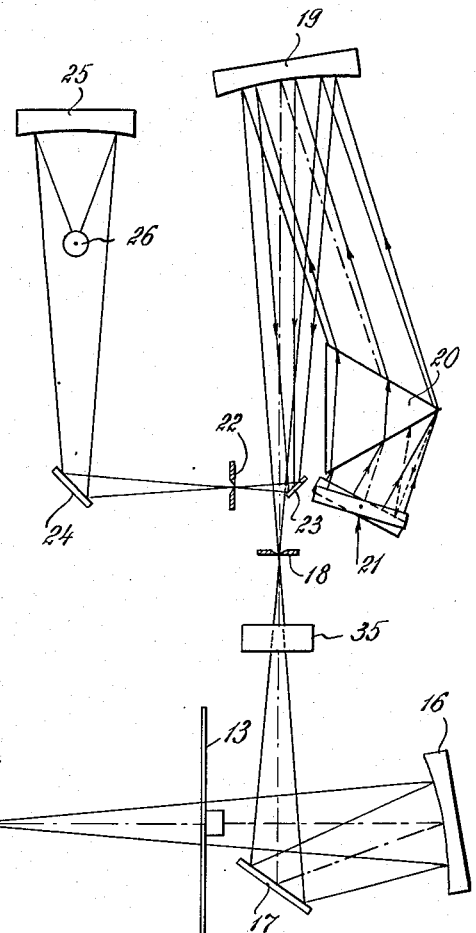
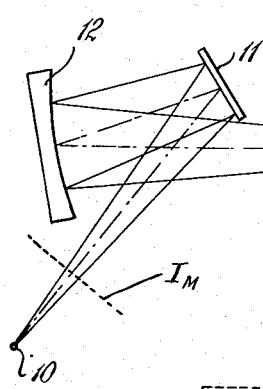
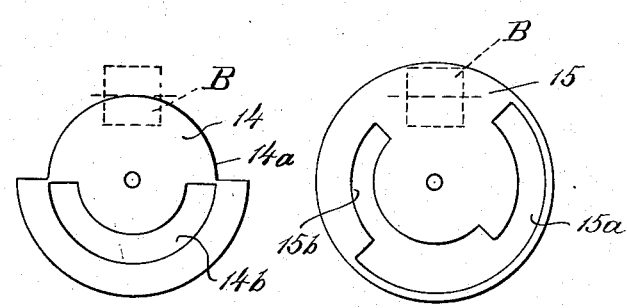
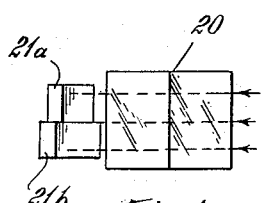
INVENTOR
John G. Atwood
BY
Pennie Edmonds Morton Barrows Taylor
ATTORNEYS May 25, 1954 J. G. ATWOOD 2,679,185
APPARATUS USING MONOCHROMATIC RADIATION
OF DIFFERENT WAVELENGTHS
Filed Aug. 1, 1952 3 Sheets-Sheet 2
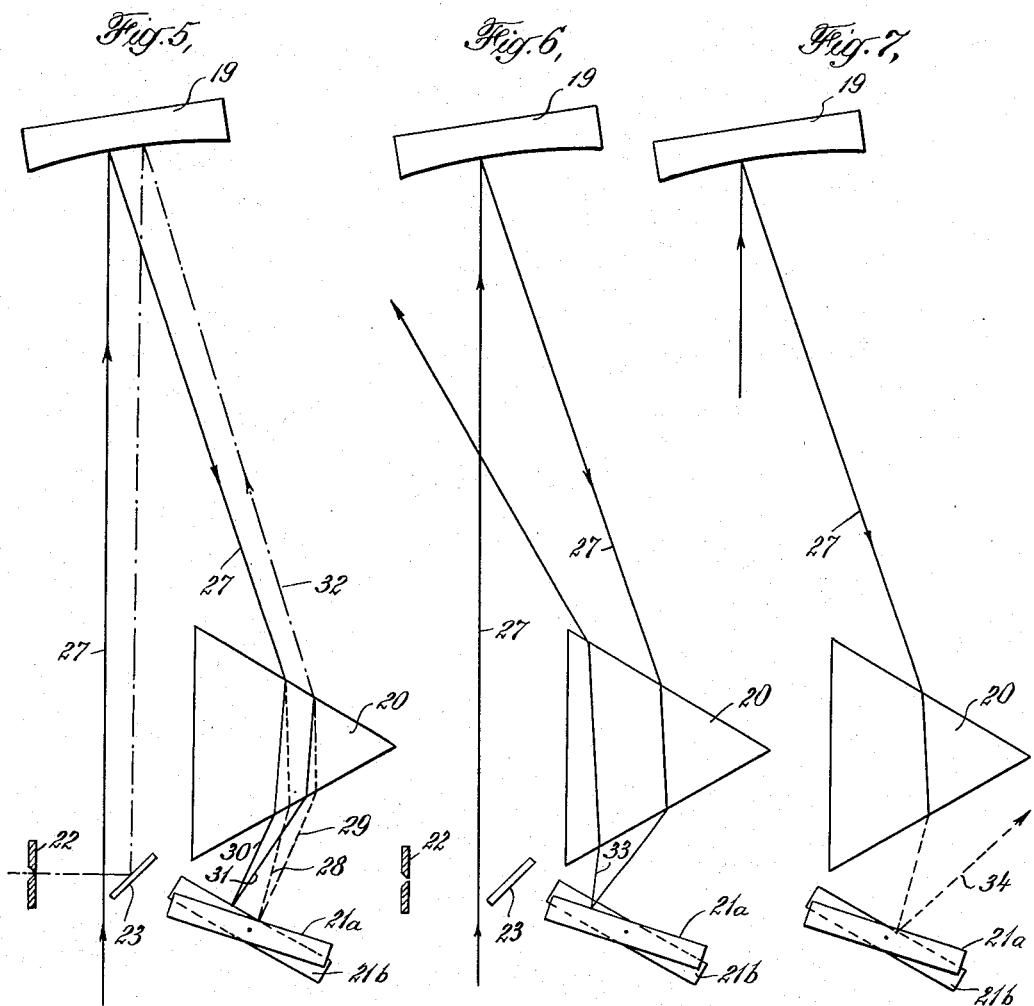
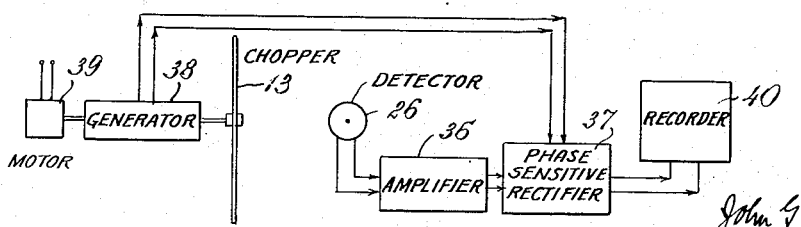

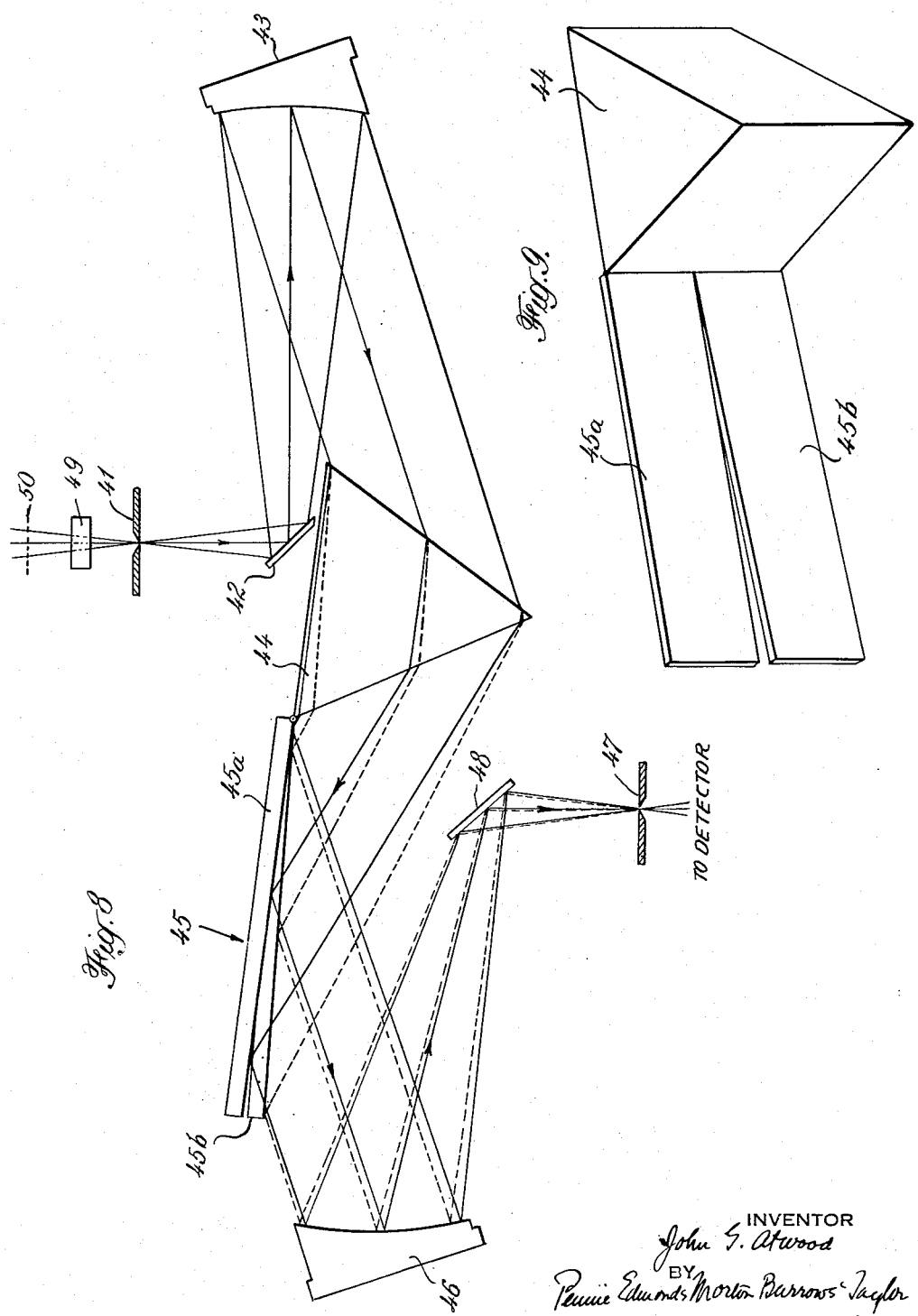

Patented May 25, 1954

2,679,185

UNITED STATES PATENT OFFICE 2,679,185

APPARATUS USING MONOCHROMATIC RADIATION OF DIFFERENT WAVELENGTHS

John G. Atwood, Darien, Conn., assignor to The Perkin-Elmer Corporation, Norwalk, Conn., a corporation of New York Application August 1, 1952, Serial No. 302,181

13 Claims. (Cl. 88—14)

This invention relates to apparatus for spectral analysis, photometry, and similar purposes, in which monochromatic radiation at different wavelengths is employed, an example of the use of such apparatus being a spectral analysis involving the quantitative determination of the composition of a two-component mixture by ascertaining the difference between or the ratio of its absorptions of energy at the selected wavelengths. More particularly, the invention is concerned with a novel apparatus of any of the kinds identified, which includes means for segregating from radiation from a source a pair of monochromatic beams of different wavelengths.

The embodiments of the invention for the several purposes stated include the same essential features but differ among themselves in other respects. Thus, a form of the new apparatus suitable for absorption spectrometry includes a source of radiation and a cell for the sample to be analyzed, which lies in the path of radiation from the source, while, in an apparatus involving the invention, which is suitable for Raman spectrometry, the source of the radiation, from which the two beams are segregated, is the sample, which is excited by a second source. In a flame photometer employing the invention, the source of the radiation is the sample, which has been excited by the flame, and an optical pyrometer, in which the invention is used, receives the radiation from the hot object, the temperature of which is to be measured. All features of the invention are advantageously utilized in a form of the apparatus for use in absorption spectrometry and, accordingly, a typical absorption spectrometer embodying the invention will be illustrated and described in detail for the purpose of explaining the principle of the invention.

In a conventional spectrometer, the radiation from a source enters the system through an entrance slit, usually passing through the sample in front of or just behind the slit. The beam is then collimated, dispersed by a prism, and focused upon an exit slit, through which radiation of the desired wavelength issues to fall upon a detector, such as a photocell, thermocouple, etc., responding to the radiation reaching it. Such an instrument may be modified by addition of an entrance slit, an exit slit, and a detector to permit its use in analysis of a sample by means of radiation of two different wavelengths, but the use of the modified instrument for such analyses is unsatisfactory for a number of reasons. It is difficult to adjust the instrument, so that radiation of the desired wavelengths falls upon the respective detectors and, in addition, errors in analysis are likely to arise because of differences in response of the detectors, resulting from variations in their sensitivity.

The present invention is, accordingly, directed to a novel apparatus for spectrometry, photometry, etc., which overcomes the difficulties in prior apparatus utilizing two beams of monochromatic radiation and a pair of detectors responding to the energy in the respective beams. The new apparatus includes a monochromator receiving radiation from a source and provided with an element for dispersing the radiation, and means, which receive dispersed radiation directly from the dispersing element and direct a part of the radiation along a normal optical path, while deviating the remainder of the radiation from that path. The deviated and undeviated radiation is focused upon an exit slit and then falls upon a single detector, and the means referred to are adjustable, so that the undeviated radiation issuing through the exit slit is of one of the desired wavelengths, while the deviated radiation issuing through the slit is of the other of the desired wavelengths. The apparatus is provided with chopping means operating to cause deviated and undeviated radiation to fall upon the detector in alternation and the signals produced by the detector are then utilized in the usual manner. As the apparatus employs only a single detector, its use is relatively simple and variations in detector performance are avoided.

For a better understanding of the invention, reference may be made to the accompanying drawings, in which Fig. 1 is a diagrammatic plan view of one form of the new instrument;

Figs. 2 and 3 are front elevational views of alternative forms of a chopping disc, which may be employed in the instrument;

Fig. 4 is a view in elevation of the prism and deviating means;

Figs. 5, 6, and 7 are diagrammatic plan views showing the operation of the deviating means;

Figure 8 is a plan view of part of a modified form of the new instrument;

Fig. 9 is a view in perspective of parts of the instrument shown in Fig. 8; and

Fig. 10 is a diagrammatic view of apparatus for utilizing the output of the detector.

An absorption spectrometer embodying the invention may be employed in different forms for examination of a sample by radiation of different kinds, and the forms of the apparatus shown are for use in spectral analysis by means of infrared radiation. When the new instrument is to be used in analysis by means of other radiation, the source is changed and other alterations made in the instrument, as will be explained.

The apparatus shown in Fig. 1 includes a source 10 emitting infrared radiation including the two wavelengths to be used for analytical purposes, and the source may be of any of the kinds commonly used. Radiation from the source falls upon a plane mirror 11 and is reflected therefrom to a spherical mirror 12, which produces an image of the source at $I_s$. The radiation reflected by the mirror 12 is chopped by a chopper 13, which includes a rotary disc. The disc may be of various forms, of which two are shown in Figs. 2 and 3.

The chopping disc 14, shown in Fig. 2, is generally circular in form but has a peripheral cut-out 14a extending through an arc of approximately 180°. The disc also has an approximately semi-circular slot 14b, the cut-out and the slot lying in opposite halves of the disc. Preferably, the radius of the disc at the cut-out 14a is approximately the same as the outer radius of slot 14b. When a beam of radiation falls upon the disc adjacent its periphery as indicated at B, part of the radiation is passed by the slot 14b and part is intercepted by the rim of the disc outside the slot. When the disc is rotated through 180°, the part of the radiation previously passed by the slot is intercepted by the disc and the part of the radiation previously intercepted by the rim of the disc is passed by the peripheral cut-out 14a.

The chopping disc 15 shown in Fig. 3 is circular in form and it is provided with an outer semi-circular slot 15a and an inner semi-circular slot 15b. The inner radius of the outer slot is the same as the outer radius of the inner slot and the slots are angularly off-set so that they overlap through an arc of 90°. With this arrangement, the disc chops a beam B of radiation falling thereon so that, during rotation of the disc through 90°, radiation is passed by the outer slot only, after which, during the next 90° travel of the disc, radiation is passed by both slots. Thereafter, for 90° of the travel of the disc, radiation is passed by the inner slot only, following which all radiation is intercepted, while the disc moves through 90°.

The radiation passed by the chopper 13 falls upon a spherical mirror 16, from which it is reflected to a plane mirror 17 lying at a diagonal. The combination of mirrors 16 and 17 focuses the radiation on an entrance slit 18, and the radiation passing the slit falls upon a paraboloidal mirror 19. The radiation is collimated by mirror 19 and the collimated beam is passed through a prism 20 and dispersed. The dispersed radiation travels to a Littrow mirror 21, which returns the radiation through the prism for a second dispersion and also acts as a deviating means.

The mirror 21 is made up of an upper part 21a and a lower part 21b and these parts are relatively rotatable upon the same axis, which is normal to the plane of dispersion and, in the instrument illustrated, is vertical. The mirror returns radiation falling thereon to the prism and the radiation passes through the prism to be dispersed a second time. The radiation leaving the prism after the second dispersion travels to the mirror 19, which focuses it upon an exit slit 22, the focused radiation being turned through an angle of 90° on its way to the slit by the diagonal mirror 23. The radiation issuing through the slit is caused to fall upon a detector and, in the instrument shown, the radiation travels to a diagonal mirror 24 and thence to an ellipsoidal mirror 25, which focuses the radiation upon detector 26.

As a result of the different angular positions of parts 21a and 21b of the split Littrow mirror 21, radiation of two different wavelengths reflected from respective parts of the mirror passes through the prism to mirror 19 and is focused by mirror 19 upon the exit slit, while radiation of all other wavelengths reflected by mirror 21 either does not reach mirror 19 or else is not focused by mirror 19 upon the exit slit. This effect of the two parts of the mirror will be apparent from Figs. 5, 6, and 7, in which the line 27 represents rays of radiation of many wavelengths traveling from the entrance slit to the paraboloidal mirror 19, by which the rays are collimated and sent to the prism. The rays are dispersed by the prism and rays of different wavelengths issue from the prism along different paths. Thus, rays of wavelength $L_1$, issuing from the prism along the path 28 (Fig. 5), fall upon the upper part 21a of the Littrow mirror and are returned to the prism along path 29, while the rays of wavelength $L_2$, issuing from the prism along path 30, fall upon the lower part 21b of the mirror and are returned to the prism along path 31. Because of the difference in orientation of the two parts 21a, 21b of the mirror, the reflected rays $L_1$ and $L_2$, after their second passage through the prism, travel to the paraboloidal mirror 19 in a plane 32 normal to the base of the prism, and are focused thereby upon the exit slit. Rays of wavelengths other than $L_1$, $L_2$, which strike the respective parts 21a, 21b of the Littrow mirror, are not focused upon the exit slit. Thus, as shown in Fig. 6, a ray may strike the upper part 21a of the mirror and be returned thereby along a path 33, so that, after emergence from the prism, the ray does not reach the paraboloidal mirror 19. Similarly, a ray may strike the lower part 21b of the mirror and be returned along a path 34 (Fig. 7), so that it does not reach mirror 19. Some rays of wavelengths other than $L_1$, $L_2$ may emerge from the prism and strike mirror 19, but the angle of incidence of such rays upon the mirror will be such that these rays are not focused by the mirror upon the exit slit.

The use of the split Littrow mirror with the two relatively angularly adjustable parts makes it possible to cause radiation of two selected wavelengths to be focused upon the exit slit and the wavelengths may be varied as desired. One part of the mirror may be considered to return the dispersed radiation to the prism along a normal optical path for a second dispersion and the other part of the mirror then performs two functions, namely, returning the radiation to the prism for the second dispersion and deviating the radiation falling thereon relative to that traveling along the normal optical path. The part of the mirror which effects such deviation of the radiation thus performs functions which, in the instrument illustrated in the copending application, are performed partly by an ordinary Littrow mirror and partly by separate deviating means.

In the new instrument, the sample cell may be placed at various positions and, if the sample is of good optical quality, the position of the cell is not critical and, when the sample is gaseous and does not adversely affect the parts of the instrument, the casing of the instrument may serve as the cell. The cell 35 has been shown in Fig. 1 as disposed in front of the entrance slit 18, but it may also be placed beyond the exit slit 22, between the entrance slit and the paraboloidal mirror 19, or between mirror 19 and the exit slit. If the sample is of bad optical quality, the cell must be placed between the source and the entrance slit or between the exit slit and the detector 26.

The disc of the light chopper 13 is placed at a point where the deviated and undeviated portions of the radiation are separated in space so that it is possible upon rotation of the chopper to chop those portions of the beam at a phase difference and to cause deviated and undeviated radiation to fall alternately upon the detector. Thus, the light chopper may be placed either close to the Littrow mirror 21 or at the location of an image thereof, the latter arrangement being preferred. For convenience, the position of the chopping disc in which it is capable of acting to interrupt the deviated and undeviated portions of the radiation periodically may be termed the "effective position" of the disc in relation to the deviating means. In Fig. 1, the chopper is shown as disposed at the location of an image of the Littrow mirror lying between the image $I_s$ of the source and the spherical mirror 16. The location of another image of the Littrow mirror is indicated by the dotted line $I_m$ lying between the source and the diagonal mirror 11. When the chopper lies close to the Littrow mirror or at the location of an image thereof, the chopper is effective to cause the radiation of the two selected wavelengths to fall alternately upon the detector. If the chopper is placed close to the Littrow mirror, or at the location of an image thereof ahead of the exit slit, the slit is alternately illuminated by radiation of the wavelengths $L_1$ and $L_2$. If the chopper is beyond the exit slit at the location of an image of the Littrow mirror, mixed radiation of the two wavelengths passes through the exit slit. At the location of an image of the Littrow mirror, the beams of radiation, which fall upon the two parts of the Littrow mirror and may be considered to consist, respectively, of undeviated and deviated radiation, are separated in space so that the disc can periodically interrupt the beams out of phase.

The signals produced by the detector 26 are amplified in amplifier 36 and fed to a phase sensitive rectifier 37, which also receives the output of the synchronous generator 38, which is driven at the same rate as the chopping disc and may have its rotor shaft mounted on the shaft of motor 39 driving the chopper. The output of the rectifier may then be fed to a suitable recorder 40. The signals produced by the detector vary in amplitude, depending upon the transmission by the sample of the radiation of the two wavelengths, and, when the chopper includes disc 14, the output of the rectifier is the difference between the two signals and may be utilized to operate an optical attenuator located at an image of the Littrow mirror and intercepting the deviated or undeviated radiation. The movement of the attenuator resulting in a null output of the rectifier is then a function of the ratio of the energies in the deviated and undeviated radiation. When the chopper includes the disc 15, the phase sensitive rectifier may be replaced by suitable breakers and filters to produce separate signals proportionate to the energies in the deviated and undeviated radiation.

In the instrument shown in Fig. 1, the radiation is passed through the prism twice for double dispersion but, when a single dispersion of the radiation is sufficient, the form of the instrument illustrated in Figs. 8 and 9 may be employed. In the modified form of the instrument, the radiation entering the entrance slit 41 from the source (not shown) is directed by the diagonal mirror 42 to the paraboloidal mirror 43, which collimates the radiation and passes it to the prism 44. The dispersed radiation issuing from the prism falls upon a flat mirror 45 made up of an upper part 45a and a lower part 45b pivoted to swing on an axis, which is normal to the base of the prism and may lie at the edge of the prism. From the mirror 45, the radiation passes to a paraboloidal mirror 46, which focuses the radiation upon an exit slit 47, the radiation striking a diagonal mirror 48 and being turned thereby in its travel from mirror 46 to the slit. Beyond the exit slit, the radiation falls upon a detector.

The instrument includes a sample cell 49, which may be placed at the various positions stated in connection with the instrument of Fig. 1. Also, the instrument includes a light chopper 50 illustrated as lying at an image of the flat mirror 45 ahead of the entrance slit. The light chopper may be placed close to the mirror 45 or at the location of any of the images thereof in the system.

The two parts 45a, 45b of the flat mirror 45 function in a manner generally similar to the two parts of the Littrow mirror employed in the instrument of Fig. 1. The dispersed radiation issuing from the prism strikes the two parts of mirror 45 and is directed thereby to the paraboloidal mirror 46 which focuses the radiation upon the exit slit. The difference in the angular adjustment of the two parts of mirror 45 causes light of the two selected wavelengths only to fall upon the slit and the two beams then fall upon the detector in alternation. The output of the detector is amplified, rectified, and delivered to a suitable meter or recorder, as desired.

The instruments in the forms shown are intended for use in the infrared field, and the collimating and focusing elements are mirrors. In the new instruments for use in the visible field, the collimating and focusing elements may be front surface mirrors or glass lenses, while, in an instrument for use in the ultraviolet field, the collimating and focusing elements may be front surface mirrors or quartz lenses.

In all forms of the new instrument, the deviation of part of the beam is effected by a split mirror, the two parts of which are capable of relative angular adjustment and which is preferably of the Littrow or flat types. The dispersion of the collimated beam is effected by a prism in the instrument shown, but other dispersing elements may be employed, if desired. The detector used will depend on the kind of radiation employed, as will also the source. In instruments, in which a relatively wide entrance slit can be used, the source may be placed at the focus of the collimating element and the slit dispensed with. Also, by using a detector having a target of proper width and positioning the detector at the proper location, the exit slit may be dispensed with. Positioning the source at the collimator focus is thus for some purposes the equivalent of using a source plus an entrance slit. Similarly, the use at the proper location of a detector having a target of proper width is the equivalent of a detector plus an exit slit. In the instrument, the optical system is reversible and the source and detector may thus be interchanged.

In the use of the new instrument for the analysis of a sample by means of radiation of the two selected wavelengths, the sample is introduced into the sample cell and the source is turned on. The slits and one part of the split mirror are then adjusted until radiation of one of the desired wavelengths is focused upon the exit slit and falls upon the detector. The other part of the split mirror is then angularly adjusted until radiation of the other of the two selected wavelengths is focused upon the exit slit and falls upon the detector. The chopping of the radiation passing to the detector causes the output of the latter to be broken up in time into two signals which are out of phase, and, by appropriate known means, the signals may be utilized to show the difference in absorption of the two wavelengths by the sample. If a second analysis is to be made by radiation of two different wavelengths, the slits and one of the parts of the split mirror are adjusted to focus radiation of one of the new wavelengths upon the exit slit, and, thereafter, the radiation of the second new wavelength is focused upon the slit by angular adjustment of the other part of the split mirror. If, in the second analysis, only one new wavelength is to be employed, the only part of the instrument to be adjusted is one part of the split mirror. In the instrument, the use of a single source and a single detector eliminates errors rising from deterioration in the source or a decrease in detector sensitivity caused by aging.

The term "wavelength," as used in the foregoing specification and appended claims, is intended to refer not to a single wavelength, but to a narrow band of consecutive wavelengths. If desired, the Littrow mirror 21 or the flat mirror 45 may be split into more than two parts, for example, three, in which event the deviated portion of the radiation may be made up of two bands separated in the spectrum.

In all forms of the new instrument, radiation from a source enters a monochromator, which includes an entrance slit or its equivalent, a collimating element, a dispersing element, a focusing element, and an exit slit or its equivalent. In the instrument of Fig. 1, the monochromator is of the double dispersion type and includes a Littrow mirror, and the paraboloidal mirror 19 is used for both collimating and focusing. In the instrument of Fig. 8, the monochromator utilizes a single dispersion and the mirror 45 passes the dispersed radiation to the focusing mirror 46, instead of returning it, as does the Littrow mirror, to the prism for a second dispersion.

The monochromator of the instrument has been modified by incorporating in it means for performing the function of deviating a portion of the dispersed radiation and, for convenience, the Littrow mirror or mirror 45 have been formed of two relatively angularly movable parts, which can be adjusted, so that the radiation reflected from one part is deviated in relation to that reflected from the other part. The same result can be obtained by the use of reflecting means separate from the Littrow mirror or mirror 45 for effecting the deviation, but the constructions shown are the simplest and most desirable.

This application is a continuation-in-part of my application Ser. No. 233,073 filed June 22, 1951.

I claim:

1. In an apparatus for segregating from radiation from a source monochromatic beams differing in wavelength, the combination of a monochromator receiving radiation from the source and including dispersing means, and means within the monochromator and separate from the dispersing means positioned to receive dispersed radiation directly from said dispersing means, said receiving means directing part of the dispersed radiation along one path and another part of the dispersed radiation along another path, a single detector, means for causing monochromatic beams of radiation differing in wavelength and leaving the directing means along the respective paths to fall upon the detector, and means disposed at an effective position relative to the directing means for periodically interrupting at a phase difference the radiation transmitted to the detector along the two paths.

2. In an apparatus for segregating from radiation from a source monochromatic beams differing in wavelength, the combination of a monochromator receiving radiation from the source and including dispersing means, and reflecting means within the monochromator separate from the dispersing means and positioned to act on the dispersed radiation and to reflect part of the radiation along one path and another part of the dispersed radiation along another path, a single detector, means for causing monochromatic beams of radiation differing in wavelengths and leaving the reflecting means along the respective paths to fall upon the detector, and means disposed at an effective position relative to the reflecting means for periodically interrupting at a phase difference the radiation transmitted to the detector along the two paths.

3. In an apparatus for segregating from radiation from a source monochromatic beams differing in wavelength, the combination of means for producing a collimated beam of radiation from the source, means for dispersing the beam, and reflecting means separate from the dispersing means positioned to have the dispersed beam falls thereon and to reflect part of the dispersed radiation along one path and another part of the radiation along another path, a single detector, means for causing monochromatic beams of radiation differing in wavelength and leaving the reflecting means along the respective paths to fall upon the detector, and means disposed at an effective position relative to the reflecting means for periodically interrupting at a phase difference the radiation transmitted to the detector along the two paths.

4. In an apparatus for segregating from radiation from a source monochromatic beams differing in wavelength, the combination of means for producing a collimated beam of radiation from the source, means for dispersing the beam, reflecting means separate from the dispersing means, upon which the dispersed beam falls and which directs part of the dispersed radiation along one path and another part along another path at an angle to the first, a single detector, means for causing monochromatic beams of the radiation differing in wavelength and leaving the reflecting means along the respective paths to fall upon the detector, and means disposed at an effective position relative to the reflecting means for periodically interrupting at a phase difference the radiation transmitted to the detector along the two paths.

5. In an apparatus for segregating from radiation from a source monochromatic beams differing in wavelength, the combination of means for producing a collimated beam of radiation from the source, means for dispersing the beam to form a spectrum, a mirror, upon which the dispersed beam falls and which comprises two parts angularly offset relative to each other about an axis normal to the plane of dispersion, a single detector, means for causing monochromatic beams of radiation differing in wavelength and reflected by the respective parts of the mirror to fall upon the detector, and means disposed at an effective position relative to the mirror for periodically interrupting at a phase difference the radiation transmitted to the detector along the two paths.

6. In an apparatus for segregating from radiation from a source monochromatic beams differing in wavelength, the combination of means for producing a collimated beam of radiation from the source, a prism for dispersing the collimated beam, a mirror, upon which the dispersed beam falls and which comprises two parts having faces normal to the plane of the base of the prism and angularly offset relative to each other about an axis normal to said plane, a single detector, means for causing monochromatic beams of radiation differing in wavelength and reflected by the respective parts of the mirror to fall upon the detector, and means disposed at an effective position relative to the mirror for periodically interrupting at a phase difference the radiation transmitted to the detector along the two paths.

7. In an apparatus for segregating from radiation from a source monochromatic beams differing in wavelength, the combination of means for producing a collimated beam of radiation from the source, means for dispersing the beam to form a spectrum, a mirror, upon which the dispersed beam falls and which comprises two parts angularly offset relative to each other about an axis normal to the plane of dispersion, a single detector, means for causing monochromatic beams of radiation differing in wavelength and reflected by the respective parts of the mirror to fall upon the detector, and radiation chopping means disposed in an effective position relative to the mirror to cause radiation transmitted to the detector along the two paths to be periodically interrupted at a phase difference.

8. In an apparatus for segregating from radiation from a source monochromatic beams differing in wavelength, the combination of means for producing a collimated beam of radiation from the source, means for dispersing the beam to form a spectrum, a mirror, upon which the dispersed beam falls and which comprises two parts angularly offset relative to each other about an axis normal to the plane of dispersion, a single detector, means for causing monochromatic beams of radiation differing in wavelength and reflected by the respective parts of the mirror to fall upon the detector, and radiation chopping means disposed between the source and the detector at an image of the mirror and acting to cause radiation transmitted to the detector along the two paths to be interrupted at a phase difference.

9. In an apparatus for segregating from radiation from a source monochromatic beams differing in wavelength, the combination of an entrance slit, means for dispersing radiation from the source admitted by the entrance slit, a mirror, upon which the dispersed beam falls and which comprises two parts having faces normal to the plane of dispersion and angularly displaced relative to each other about an axis normal to said plane, a single exit slit, means for receiving radiation from the two parts of the mirror and focusing the radiation upon the exit slit, a single detector receiving radiation issuing through the exit slit, and radiation chopping means disposed in an effective position relative to the mirror, in which said chopping means acts to cause radiation reflected from respective parts of the mirror to strike the detector intermittently and at a phase difference.

10. In an apparatus for segregating from radiation from a source monochromatic beams differing in wavelength, the combination of an entrance slit, a single exit slit, a dispersing element between the slits, an optical component receiving radiation through the entrance slit and collimating the radiation and passing the collimated beam to the dispersing element for dispersion, reflecting means separate from the dispersing element receiving the dispersed beam from the dispersing element and returning part of the radiation along one path and another part of the radiation along another path, both reflected parts of the radiation traveling to the dispersing element for a second dispersion and the twice-dispersed radiation falling upon the component and being focused thereby upon the exit slit, the radiation issuing through the exit slit being made up of monochromatic radiation of two wavelengths, a single detector, upon which said monochromatic radiation falls, and radiation chopping means disposed at an effective position relative to the reflecting means to cause radiation of said two wavelengths to fall upon the detector intermittently and at a phase difference.

11. An apparatus suitable for use in absorption spectrometry, which comprises a source of radiation, means for producing a collimated beam of radiation from the source, an element for dispersing the collimated beam, a mirror, upon which the dispersed radiation falls and which comprises two parts angularly offset relative to each other about an axis normal to the plane of dispersion, a single exit slit, means receiving radiation reflected by the respective parts of the mirror and focusing said radiation upon the exit slit, a single detector, upon which radiation issuing through the exit slit falls, and radiation chopping means in an effective position relative to the mirror to cause radiation reflected by the two parts of the mirror to fall upon the detector intermittently at a phase difference.

12. An apparatus suitable for use in absorption spectrometry, which comprises a source of radiation, an optical component receiving radiation from the source and producing a collimated beam thereof, an element for dispersing the collimated beam, a mirror, upon which the dispersed radiation falls and which comprises two parts angularly offset relative to each other about an axis normal to the plane of dispersion, the mirror returning the dispersed radiation to the element for a second dispersion, a single exit slit, the twice-dispersed radiation passing from the element to the component and being focused thereby upon the exit slit, a single detector, upon which radiation issuing through the exit slit falls, a sample cell in the path of the radiation traveling from the source to the detector, and radiation chopping means disposed at an effective position relative to the mirror and acting to cause radiation reflected by the two parts of the mirror to fall upon the detector intermittently at a phase difference.

13. An apparatus suitable for use in absorption spectrometry, which comprises a source of radiation, an optical component receiving radiation from the source and producing a collimated beam thereof, an element for dispersing the collimated beam, a mirror, upon which the dispersed radiation falls and which comprises two parts angularly offset relative to each other about an axis normal to the plane of dispersion, an exit slit, an optical component focusing radiation reflected from the mirror upon the exit slit, a single detector, upon which radiation issuing through the exit slit falls, a sample cell in the path of radiation traveling from the source to the detector, and radiation chopping means disposed at an effective position relative to the mirror and acting to cause radiation reflected by the two parts of the mirror to fall upon the detector intermittently at a phase difference.

References Cited in the file of this patent

UNITED STATES PATENTS

| Number | Name | Date |
|---|---|---|
| 2,063,140 | Allison | Dec. 8, 1936 |
| 2,330,877 | Fleisher et al. | Oct. 5, 1943 |
| 2,439,373 | Stearns | Apr. 6, 1948 |
| 2,462,946 | Coggeshall et al. | Mar. 1, 1949 |

FOREIGN PATENTS

| Number | Country | Date |
|---|---|---|
| 664,233 | Germany | Aug. 24, 1938 |